United States Patent [19]
Bjerke

[11] 3,845,383
[45] Oct. 29, 1974

[54] METHOD AND APPARATUS FOR INSPECTION OF FERRO-MAGNETIC BILLETS

[75] Inventor: Harold Chr. Bjerke, Osteras, Norway

[73] Assignee: Elkem-Spigerverket A/S, Oslo, Norway

[22] Filed: Oct. 4, 1973

[21] Appl. No.: 403,602

[30] Foreign Application Priority Data
Oct. 10, 1972 Norway.............................. 3620/72

[52] U.S. Cl. ................................................. 324/38
[51] Int. Cl............................................ G01r 33/12
[58] Field of Search ...................................... 324/38

[56] References Cited
UNITED STATES PATENTS
3,573,979 4/1971 Honjo .............................. 324/38 X
3,614,604 10/1971 Reinshagen ......................... 324/38

*Primary Examiner*—Stanley T. Krawczewicz
*Attorney, Agent, or Firm*—Eyre, Mann & Lucas

[57] ABSTRACT

A process and apparatus for the detection of hairline cracks in ferro-magnetic billets is disclosed. Alternating current is used to heat the surface of the billet whereby magnetic powder on the surface of the billet melts to show imperfections in the surface of the billet.

5 Claims, 3 Drawing Figures

METHOD AND APPARATUS FOR INSPECTION OF FERRO-MAGNETIC BILLETS

The present invention relates to a method and apparatus for the magnetic inspection of ferro-magnetic billets to determine cracks and scratches in the surface thereof.

Magnetic inspection equipment for inspecting ferro-magnetic billets is well known in the prior art for detection of scratches and cracks in elongated ferro-magnetic objects. The procedure is used largely because many of the cracks are so narrow that they are not visible to the naked eye. When an electric current is passed through an elongated ferro-magnetic object in its longitudinal direction, a magnetic field is created at a right angle to the direction of the current. This field, however, will be very much influenced by cracks and scratches, even when extremely fine cracks are involved. The shape of the magnetic field is made visible by sprinkling a magnetic powder on the surface of the billet and, because of the way that the magnetic powder aligns itself, cracks and scratches not visible to the naked eye become easily discernible.

The magnetic powder, usually an iron powder to which a fluorescent substance has been added, is finely distributed over the surface of the billet usually by rotation of the billet under the powder source. Excess powder is removed by gravity by continuing rotation of the billet for one extra revolution after it has been coated with the magnetic powder. An operator then inspects the billet under ultraviolet light. Because of the variation in the magnetic field due to cracks and scratches these are easily visible to the operator who can then mark them with for example chalk so that they will be easily located for subsequent treatment.

Of course, the disadvantage to the foregoing procedure is that it is time consuming and expensive to have to have an operator to individually mark each crack by hand. Of course, others have tried to make the magnetic inspection process automatic so that the operator is not necessary. For example, an attempt has been made to employ a powder mixture containing substances which will, upon heating, cause adhesion of the powder mixture in those areas where the magnetic field has caused the powder to be concentrated due to a crack or scratch. Various forms of heat have been employed for this purpose including oil and propane burners and infra-red quartz lamps. These forms of heat, while accomplishing the desired result of eliminating the operator, have many serious drawbacks. These forms of heat cause a strong heating not only of the powder but also of the surrounding areas of the billet. It is therefore necessary to employ a powder mixture with a comparatively high melting point so that the powder does not melt or form aggregates before it is sprinkled on the billet from the heat generated by the burners or lamps. However, elevation of the melting point of the powder necessitates an increased supply of heat to melt it which results in a vicious cycle of even higher melting points and temperatures and, as a practical matter, this form of automatic detection is not feasible.

The applicant has now discovered means by which automatic magnetic inspection of elongated ferro-magnetic objects can be carried out without the disadvantages of the prior art processes. The applicant accomplishes this result by passing an alternating electric current through the billet after the magnetic powder has been applied to the surface of the billet by the magnetizing operation previously described. The magnetic powder comprises finely divided iron or iron alloys and a powdered coloring agent which is capable of adhering to the billet surface by heating. The alternating current which passes through the billet heats the surface of the billet without heating the rest of the billet or surrounding equipment thereby supplying sufficient heat for melting the color pigment on the surface of the billet but not supplying heat which melts or causes aggregation of powder not yet applied.

Alternating current, when applied to elongated ferro-magnetic objects has a pronounced "skin" effect. By this it is meant that the surface of the billet is heated but the remainder of it is not. This has the twofold advantage of requiring relatively modest amounts of energy to heat the surface of the billet since it is the only part of the billet being heated and not creating excess heat which would be deleterious to the magnetic powder with coloring pigment. Only a brief current pulse is required after the magnetic powder is applied. For example, it has been found that with 50 Hz. frequency, a 15,000 amp current for ten seconds will be sufficient to raise the surface temperature of the billet to a degree sufficient to melt color pigments but without creating too much heat or too high an energy cost. With a 50 Hz. frequency, the current concentrates at the surface of the billet to a depth on the order of one millimeter. If alternating current with a higher frequency is employed, the penetration depth will be reduced resulting in additional advantage.

The particular coloring pigment selected for use in the magnetic powder is of no great importance so long as it will melt under the application of the alternating current supplied and will adhere to the surface of the billet when melted. In general, since there is so little heat generated by the process of the present invention except on the surface of the billet, the melting point of the color pigment can be quite close to ambient temperature, for example about 20° above ambient temperature. This is a practical temperature for the coloring pigment since it keeps the powder requirement for heating within a technically practical and economically feasible frame. The applicant has found ES/M-0-M/73 color pigment available from ELKEM-SPIGERVERKET a/S, Box 5430, Oslo 3, Norway to be suitable for use in the process of the invention.

It is necessary according to the present invention that the current pulse applied for heating the surface of the billet be greater than the magnetizing current. The reason for this is immediately apparent. The magnetizing current must be sufficient to attract the ferrous particles of the magnetic powder but it must not be great enough to heat the surface of the billet to a degree sufficient to melt the coloring agent. The heating current, since it must be of sufficient intensity to heat the surface of the billet to a degree sufficient to melt the coloring agent, must be higher than the magnetizing current. While the billet is normally rotated during the magnetizing step, it is preferred that rotation of the billet be stopped during the current heating step in order to keep losses of current to a minimum. Furthermore, to apply electric current best results have been achieved with conical contact chucks as will be more fully hereinafter described. The conical contact chucks are preferably made of an austenitic steel since austenitic steel will pass current through its full cross section thus minimizing undersirable heat which could be produced with the use of other steel chucks.

These and other aspects of the present invention may be more fully understood with reference to the following Figures in which.

Figure 1:
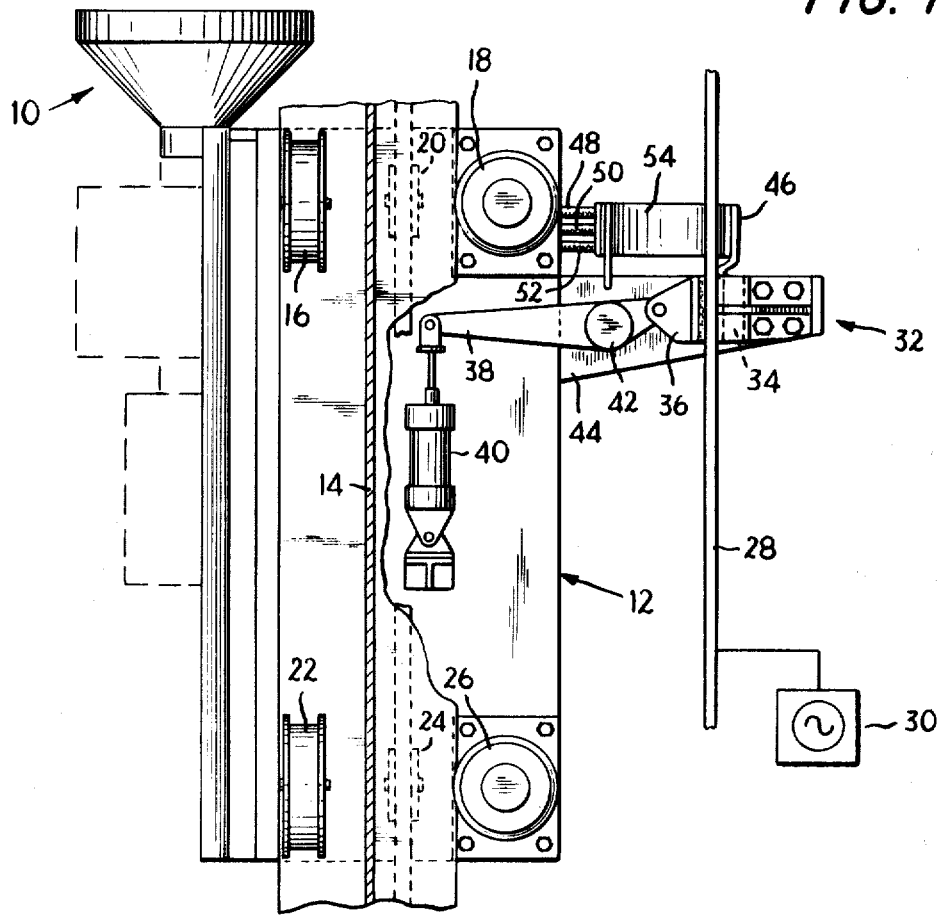
FIG. 1 is a top partly schematic view of an apparatus which can be used in carrying out the process of the present invention.
Figure 2:
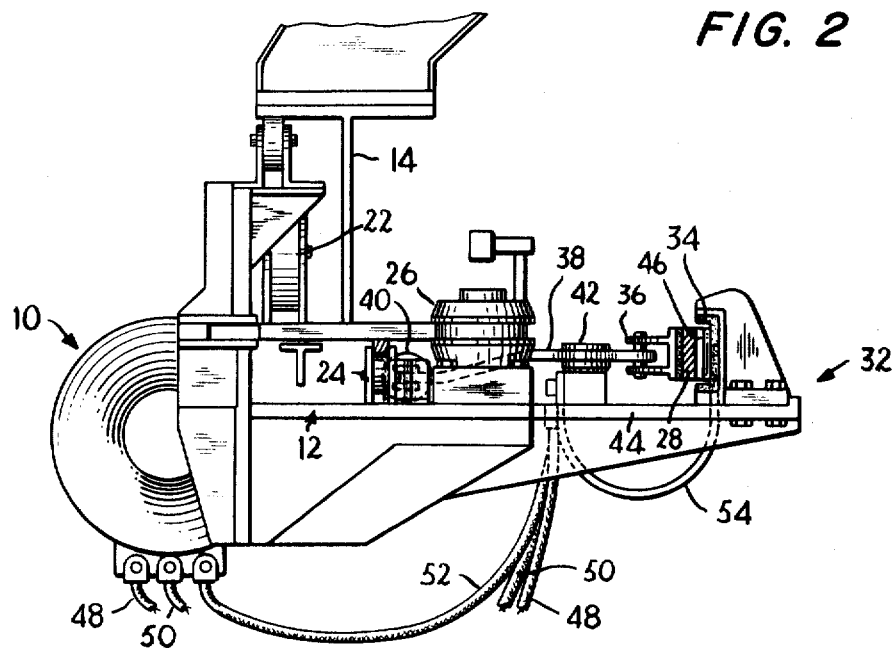
FIG. 2 is an end view of the apparatus of FIG. 1.

Referring now to FIGS. 1 and 2 there is shown a conical chuck represented schematically as 10 and it is moveable by means of a carriage 12 which travels along a carriage support beam 14. The conical chuck is moveable so that it can be pressed against the end of billets of different lengths. The carriage 12 is supported by various wheels 16, 18, 20, 22, 24 and 26 which contact the supporting beam to guide the carriage 12.

Current is supplied to the chuck 10 by means of a longitudinal bus bar 28 which is connected to a source of alternating current 30. The alternating current source 30 can suitably comprise an adjustable transformer so that it can supply not only the alternating current for heating but also alternating current for the magnetizing step. In the preferred form of construction, an electrical interlock (not shown) is provided so that the current pulse for heating is not supplied until rotation of the billet has been stopped after the application of the magnetic powder.

In order to reduce transmission losses, the source of electric supply is preferably arranged close to the conical chuck. As shown in FIG. 1, this is accomplished by means of a contact device 32 which travels along bus bar 28. Clamps 34 and 36 are provided on either side of the bus bar and they are adapted to be clamped against the bus bar under the urging of the eccentric arm 38 by hydraulic cylinder 40. The eccentric arm is pivoted at 42 on a bracket 44 which is rigidly affixed to the carriage 12. Element 46, connected to clamp 34, passes the current from the bus bar to cables 48, 50, and 52 through a flexible conductor 54.

The illustrated electrical contacting construction is highly beneficial since it not only provides a source of current close to the conical chuck but also provides excellent contact between the moveable conical chuck 10 and the bus bar 28 which minimizes current losses especially during transmission of the comparatively strong heating current.

Figure 3:
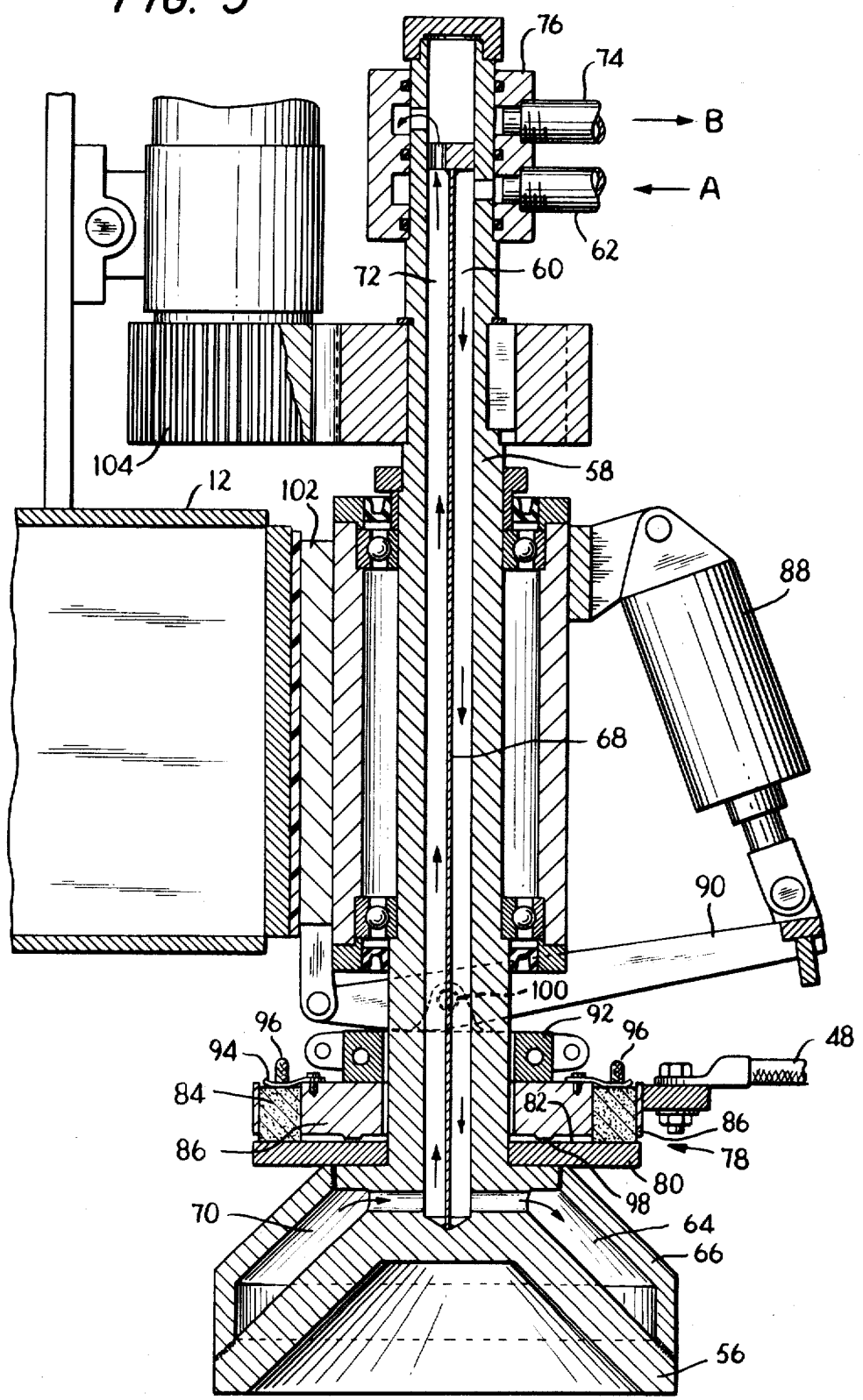
FIG. 3 is a detailed construction of a conical chuck which can be used in carrying out the process of the present invention.

FIG. 3 illustrates in detail a conical chuck useful in carrying out the process of the present invention. The conical chuck comprises a conical clamping surface 56 which is the part of the chuck which comes into contact with the billet. The chuck surface 56 is preferably connected to and even more preferably made integral with an elongated cylinder 58. The elongated cylinder 58 is made hollow so that cooling water can be passed through it to cool the chuck surface. As previously mentioned, the conical chuck is preferably made of an austenitic material since it will transmit high currents without an undue amount of surface heat. However, even when an austenitic material is used in the conical chuck the amount of current necessary during the heating period is high enough to raise the temperature of the chuck and this can be deleterious. To overcome this, the chuck is preferably cooled, suitably by water. Water is introduced to the hollow right side of the cylinder 60 through orifice 62 as illustrated by arrow A. The water travels down tube 60 in the direction of the arrows and into closed space 64 suitably formed by welding a housing 66 to the conical surface 56. A central vane 68 is provided which divides not only the hollow cylinder as shown but also the closed space surrounding the contact surface 56. Of course, there is an opening at the periphery of the vane so that water can travel from closed space 64 into closed space 70 and thence up tube 72 on the left side of the dividing partition 68. The cooling water then departs through orifice 74 in direction B. The orifices 62 and 74 are preferably in communication with the cylinder 58 through a swivel coupling 76 since in the preferred form of the invention the conical chuck is used not only for the heating current but also for the magnetizing current/powder sprinkling and is therefore rotated during this part of the cycle.

Electric current is fed to the chuck surface through wires 48, 50 and 52 of which only 48 is shown in this figure. The electrical connecting assembly between the cables and the chuck surface 56 is made of as short a distance as possible suitably by the electrical arrangement in the area 78. In this arrangement, an electrical receiving flange 80, suitably made of copper, is in intimate electrical contact with the conical surface 56 and rotates therewith. The flange 80 has a rear contacting surface 82 which receives current from carbon brushes 84. The carbon brushes are mounted in contact element 86 which is nonrotating but axially moveable under pressure from cylinder 88 through bearing arm 90 and pressure plate 92. The carbon brushes are maintained in contact with the contact surface 82 of the flange 80 by means of spring steel clips 94 which are mounted in the contact element 86 as shown. The carbon brushes are maintained in contact with the contact element 86 by means of flexible straps 96. Whle only two brushes are illustrated in the drawing, it will be understood that more can be employed if desired. The carbon brushes 84 transmit current to the flange during the magnetizing step when the billet is being rotated.

The current to be supplied to the chuck surface during the heating step is considerably higher than that necessary during the magnetizing step and therefore cannot be practicably supplied by the carbon brushes. Since the entire contact element 86 is "live" the current can be directly supplied to the flange 15 by closing the gap 98 between the two so that they come in contact. While contact element 86 is not rotatable, it will be kept in mind that in the preferred form of the invention rotation of the billet and therefore of the chuck surface is stopped during the heating step.

A suitable means for bringing the contact element 86 (or a protruding part thereof if preferred) into contact with the contact surface 82 of the flange 80 is by means of a pressure cylinder 88 (either pneumatic or hydraulic) pivotably connected to a bearing arm 90 which pivots about member 100 mounted on the contact element-pressure plate assembly. The bearing arm 90 is pivotably mounted on its remote end to support member 102 which is rigidly affixed to the carriage 12. It will, of course, be understood that other means could be used for maintaining the necessary pressure between the contact element 86 and the flange 80. It will also be understood that flange 80 can be made integral with chuck contacting surface 56 if desired.

In order to rotate shaft 58, there is suitably provided a drive arrangement shown schematically at 104. The drive arrangement can comprise an electric or hydraulic motor with a gear transmission and preferably at least one of the gear wheels is made of an electrically insulating material. It will be readily apparent to those skilled in the art that there are numerous other locations where electrical insulation must be provided and others where it is desirably provided. Insulation is not a major problem, however, since the voltages used will normally be comparatively low.

While the applicant has found it best to use alternating current for both the magnetizing and heating steps, it will be understood that direct current can be used for the magnetizing step if desired. Direct current can be used in the apparatus illustrated in the figures by simply changing power supply 30 so that it provides direct current during the magnetizing step and alternating current during the heating step.

It will be understood that the claims are intended to cover all changes and modifications of the preferred embodiments of the invention, herein chosen for the purpose of illustration, which do not constitute departures from the spirit and scope of the invention.

What is claimed is:

1. A process for the inspection of elongated ferro-magnetic objects comprising:
    a. magnetizing the elongated ferro-magnetic object by passing a current through it;
    b. applying to the magnetized ferro-magnetic object a powder comprising finely divided iron or iron alloys and a coloring agent in powder form which, upon heating, will adhere to the surface of the ferro-magnetic object; and
    c. thereafter heating the surface of the ferro-magnetic object with an alternating current of sufficient intensity to cause the coloring agent to adhere to the ferro-magnetic object.

2. The process of claim 1 wherein the elongated ferro-magnetic object is rotated during step (b).

3. The process of claim 2 wherein the rotation of the ferro-magnetic object is stopped before the alternating current heating step.

4. The process of claim 1 wherein the magnetizing step is carried out with alternating current.

5. The process of claim 4 wherein the alternating current has a higher frequency during the heating step than during the magnetizing step.

* * * * *